Figure 5:
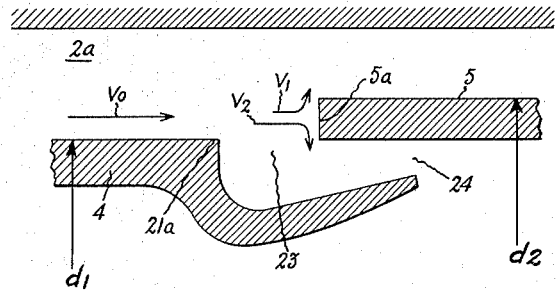

Jan. 18, 1955
D. C. BERKEY
2,699,648
COMBUSTOR SECTIONAL LINER STRUCTURE
WITH ANNULAR INLET NOZZLES
Filed Oct. 3, 1950
2 Sheets-Sheet 1
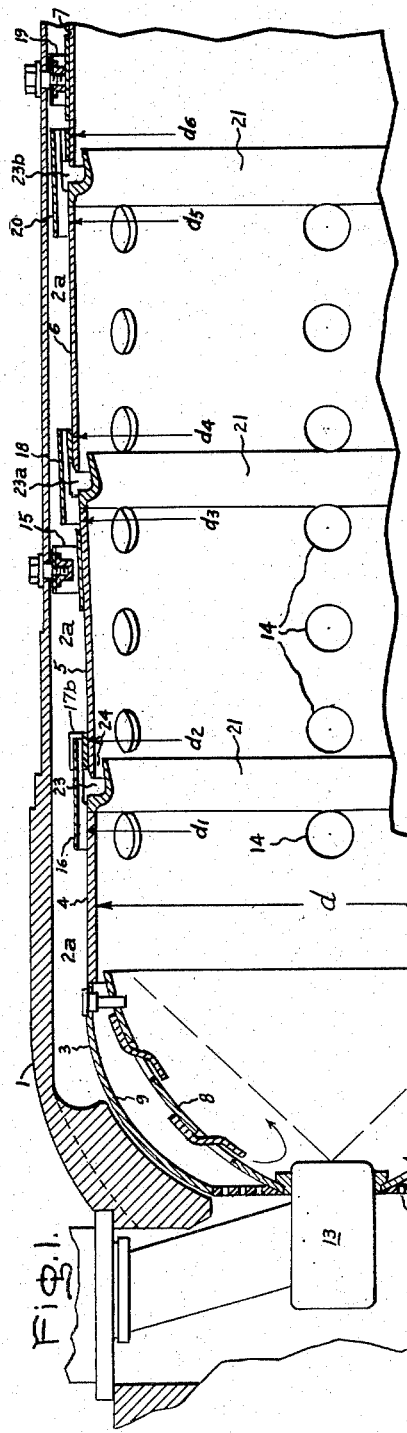
Inventor:
Donald C. Berkey,
by Ernest F. Britton
His Attorney.

Jan. 18, 1955

D. C. BERKEY 2,699,648

COMBUSTOR SECTIONAL LINER STRUCTURE
WITH ANNULAR INLET NOZZLES

Filed Oct. 3, 1950

2 Sheets-Sheet 2

Inventor:
Donald C. Berkey,
by *Kiess*
His Attorney.

United States Patent Office 2,699,648
Patented Jan. 18, 1955

2,699,648

COMBUSTOR SECTIONAL LINER STRUCTURE WITH ANNULAR INLET NOZZLES

Donald C. Berkey, Scotia, N. Y., assignor to General Electric Company, a corporation of New York Application October 3, 1950, Serial No. 188,153

6 Claims. (Cl. 60—39.65)

This invention relates to combustion chambers or "combustors" for burning fluid fuel under pressure, as in a gas turbine powerplant, particularly to a special louver structure for admitting a cooling and insulating sheath of pure air along the inner surface of the liner defining the combustion space.

The invention is particularly applicable to combustors of the so-called "Nerad type" disclosed in the United States Patent 2,601,000 of Anthony J. Nerad, issued June 17, 1952, on an application Serial No. 750,015, filed May 23, 1947, and assigned to the same assignee as the present application. The specific gas turbine combustor for which the present invention was developed is disclosed in United States Patent 2,547,619 issued April 3, 1951, on an application of B. O. Buckland, Serial No. 62,333, filed November 27, 1948, and assigned to the same assignee. This combustor comprises a substantially cylindrical outer housing and disposed therein a cylindrical liner structure spaced from the outer housing to define an annular air supply passage communicating with longitudinal rows of circular combustion air inlet ports. The liner assembly comprises a dome member closing one end and a plurality of separate circular sections having adjacent end portions arranged in concentric radially spaced relation to define a series of annular nozzles for injecting air to form a cooling and insulating sheath along the inner surface of the next succeeding section. Thus, the entire inner surface of the liner is kept comparatively free from contact with partly burned carbon particles in the combustion space. This arrangement has been found particularly effective in preventing the deposition of carbon on the liner wall, with the resulting tendency to produce "hot spots" and the accompanying tendency for the liner to buckle or burn through. In order to obtain long life for the liner and reduce or eliminate the deposition of carbon so that only infrequent inspection and cleaning is required, it has been found advisable to very carefully control the velocity of air through the annular supply space surrounding the liner, particularly to achieve a uniform cooling effect by providing constant velocity flow of air in this annular space. It has also been learned that the velocity and radial thickness of the sheath of cooling and insulating air projected along the inner surfaces of the liner sections must be carefully selected if this protective sheath is to perform its intended function effectively.

Accordingly, an object of the present invention is to provide an improved liner structure in combination with an outer housing so arranged that uniform cooling of the outer surface of the liner is effected by reason of the constant velocity air flow provided in the annular air supply space between liner and housing.

Another object is to provide an improved louver arrangement for forming the cooling and insulating sheath of air on the inner surfaces of the liner.

A still further object is to provide a liner of the sectional type with special stiffening means for preventing thermal distortion of the respective liner sections.

Figure 6:
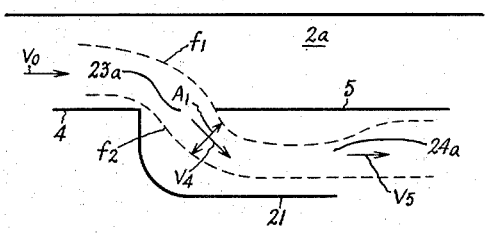
Figure 7:
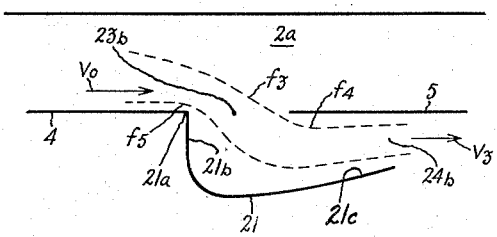

Other objects and advantages will become apparent from the following description, taken in connection with the accompanying drawings in which Fig. 1 is a partial sectional assembly view of a gas turbine combustor having a liner in accordance with the invention, Fig. 2 is a detail view in elevation showing the means for supporting adjacent end portions of the liner sections relative to each other, Fig. 3 is an enlarged sectional view of the special louver structure for admitting the cooling and insulating air, Fig. 4 is a partial sectional view of a somewhat modified form of the special louver arrangement, and Figs. 5, 6 and 7 are diagrammatic illustrations of the method of operation of the louver structures.

Generally, the objects of the present invention are attained by giving the liner sections such a shape as to provide a smoothly and continuously contracting area for the air supply space defined between the liner and the outer housing so that the air velocity therein will be maintained at a very nearly constant value of the magnitude required for most effective cooling of the outer surface of the liner sections. The downstream end of each liner section is provided with an annular louver-defining portion including a radially inwardly extending wall portion adapted to cooperate with the adjacent edge of the next succeeding liner section to form a substantially sharp-edged inlet orifice, and an axially extending portion adapted to overlap the inner surface of the next adjacent liner section and radially spaced therefrom to define the cooling and insulating sheath discharge orifice. This special louver-defining section at the downstream end of each liner segment has a special advantage in that it provides a stiffening effect for the respective liner sections, helping them to resist thermal distortion which might otherwise change the shape and effective area of the annular cooling air nozzles.

Referring now more particularly to Fig. 1, the combustor is illustrated as comprising an outer housing 1 defining at one end an inlet passage 2 for receiving air under pressure from a suitable compressor (not shown). The liner which serves to define the combustion space proper comprises a plurality of sections indicated generally at 3, 4, 5, 6, and 7. The initial section 3 is the "end dome assembly" comprising an inner dome 8 surrounded by a spaced substantially hemispherical shroud 9. This end dome and shroud assembly are as disclosed in the above-mentioned Patent 2,547,619 of B. O. Buckland and need not be described in detail here, except to note that air from the inlet passage 2 passes through a plurality of metering holes 10, diffuses uniformly through the air supply space defined between dome 8 and shroud 9 and enters the primary combustion space of the liner through a plurality of ports 11 having associated therewith deflecting plates 12 arranged to direct a thin film of cooling and insulating air radially inward toward the fuel nozzle 13. The outer circumferential portion of dome 8 is radially spaced from the inner surface of liner section 4 to define an annular nozzle through which cooling and insulating air flows along the inner surface of section 4, as indicated by the arrow 4a in Fig. 1. The end dome per se is of the general type disclosed in Patent 2,581,999, issued January 8, 1952, of Walter L. Blatz, assigned to the same assignee.

The first cylindrical liner section 4 is secured, as by welding, to the adjacent edge of the dome shroud 3, and is provided with six circumferentially spaced air inlet ports 14, the spacing and arrangement of which are in accordance with the above identified application of Anthony J. Nerad. This initial liner section may also be provided with a hole for admitting the end portion of a suitable spark-plug for ignition, and a port communicating with a "cross ignition tube" for communicating flame from one combustor to another. These openings are not illustrated in Fig. 1 because not material to an understanding of the present invention.

The second cylindrical liner section 5 has three circumferential rows of air inlet ports 14 and is supported adjacent its downstream end by means of a plurality of resilient brackets or loops indicated generally at 15, the precise structure of which is disclosed more fully in the above-mentioned patent of B. O. Buckland. It need only be noted here that these supports 15 are intended to accurately maintain the section 5 concentric with the outer housing 1 while permitting some differential thermal expansion therebetween without imposing excessive stresses on the respective parts. The left-hand end portion of section 5 is supported in coaxial relation with the adjacent end of section 4 by means of a plurality of axially extending key members comprising a bracket 16 secured, as by spot-welding at 16b (Fig. 2), to the outer surface of the section 4 and having an axially extending finger portion 16a overlying the outer surface of the liner section 5. From a comparison of Figs. 1 and 2, it will be understood that the finger portion 16a is generally U-shape in cross section, having parallel depending side portions fitting a "keyway" defined between a pair of L-shaped brackets welded to the outer surface of liner section 5. These brackets are shown at 17 in Figs. 1 and 2 and comprise one leg 17a spot-welded, as at 17c, to the outer circumference of liner section 5 and a radially projecting leg 17b adapted to slidingly engage the side surfaces of the finger portion 16a. It will be appreciated of course that there are three or more of these positioning devices for holding adjacent ends of the liner sections coaxial. This supporting arrangement is generally similar to that disclosed in the above-described patent of B. O. Buckland, and the details need not be described further here.

Similarly, the liner section 6 is supported by resilient brackets (not shown) similar to those shown at 15 in Fig. 1, and by a finger-keyway connection 18 similar to the elements 16, 17 described above. Liner section 6 also has three circumferential rows of air inlet ports 14 arranged similarly to those shown in section 5.

Liner section 7 is likewise supported by resilient brackets 19 and finger-keyway members indicated generally at 20.

It will be apparent from Fig. 1 that the combustion air inlet ports 14 in the respective liner sections 4, 5, 6 are arranged in straight longitudinal rows that admit the air required both for the combustion process and for cooling and diluting the hot gases to a temperature which the gas turbine rotor can stand. The function of the cooling and insulating air indicated by the flow arrow 4a in Fig. 1, and the similar annular jets defined by the special louver arrangement described hereinafter, is not to furnish combustion air but to provide a cooling effect for the liner wall and, more important, to provide a protective blanket of substantially pure air along the inner surface of the liner wall so that partly burned fuel particles in the combustion space will not contact the comparatively cool liner and be deposited thereon as carbon, requiring frequent inspection and cleaning of the combustor.

The special louver arrangement for providing these cooling and insulating air sheaths comprises an annular section shown in Fig. 1 at 21 as being separately fabricated, for instance, by rolling bar stock to a ring shape, machining it to the cross-section indicated, and welding to the adjacent end of liner section 4. The cross-section shape of this louver-defining ring is extremely important and is shown to an enlarged scale in Fig. 3.

As will be seen in Fig. 3, the outer surface of liner section 4 and the outer circumference of ring 21 form a smooth continuous surface parallel with the axis of the combustor and having a diameter d identified specifically in Figs. 1 and 3 as $d_1$. This smooth surface terminates at a sharply machined square corner 21a, from which the surface 21b extends radially inward and then curves smoothly in to a generally axial direction to merge with the axially extending substantially cylindrical surface 21c. The inner surface of ring 21 curves smoothly so as to join the inner surface of liner section 4 at 21d and tapers outwardly at 21e to form a comparatively narrow terminal edge 21f.

The next adjacent liner section 5 is spaced axially from the ring 21 so as to define an annular inlet opening 23 having an axial width indicated w in Fig. 3 and a radial height indicated h. It is also to be noted that the surface 21c projects into the liner section 5 with an "overlap" of a magnitude indicated by the dimension o. It remains to be observed that the edge of liner section 5 adjacent the annular inlet is beveled as indicated at 22 in Fig. 3, for a reason which will become apparent hereafter.

The proper magnitude for the critical dimensions of this special louver, and the significance of the shape and dimensions, will become apparent from the following description of the method of operation.

Throughout this description of the operation, it is to be noted that every attempt is made to prevent the velocity head in the passage 2a having any effect on the rate of flow through the cooling and insulating louver nozzles 23, 24. In the normal operation of the Nerad type combustor, there will be a static pressure difference on the order of 1 to 3% of the initial pressure between the air supply space 2a and the combustion space within the liner. It is, of course, this pressure drop which causes the flow of combustion air inwardly through the ports 14 to form the strong discrete jets required by the special mode of operation of the Nerad combustor. In order to keep the velocity of the annular cooling and insulating air jets as low as possible, the whole design of louvers in accordance with this invention is arranged so that only this static pressure difference produces the flow through the louvers, no increment being added thereto by any conversion of velocity head to static head.

As will be appreciated by those skilled in the art of gas turbine design, the compressor and related passages which supply air to the combustion system are very carefully designed so that the supply is uniform in pressure, velocity, and direction. Thus it is assumed that the flow into the combustion chamber through the inlet 2 is perfectly uniform so that air is supplied at uniform pressure and velocity through the annular supply passage 2a defined between the liner assembly and the outer housing 1. It will also be appreciated that it is desirable that the velocity of the air flow in passage 2a be so selected as to give the optimum cooling effect for the liner walls. In the combustor for which the present invention was developed, this optimum velocity was found to be on the order of 260 feet per second, with a compressor discharge pressure on the order of 85 lbs. per square inch, absolute. In other words, the axial velocity head of the air flow in the annular passage 2a represents on the order of 2% of the total head of the air supplied to the combustor. In order to maintain the velocity constant at this optimum value along the length of the air supply passage 2a, the succeeding liner sections 4, 5, 6, 7, taper progressively outward so that the effective area of the passage 2a progressively decreases as more and more of the air flows into the combustion space through the air supply ports 14 and the successive louver inlets 23. It will be seen in Fig. 1 that the first liner section 4 is a right circular cylinder, having an outer surface parallel with the inner surface of the housing 1. However, since a certain amount of the air in passage 2a enters the combustion space through the first row of holes 14 in liner 4, and a further increment enters through the annular inlet 23, it is necessary that the liner section 5 be of a somewhat greater outside diameter in order that the axial velocity in passage 2a be maintained constant. Specifically, it will be seen that the diameter $d_2$ of the left-hand end of liner section 5 is appreciably greater than the diameter $d_1$ of the adjacent end of liner section 4. Furthermore, liner section 5 is not a right circular cylinder but flares gradually outward to a still larger diameter $d_3$ at the right-hand end thereof. Similarly, the diameter $d_4$ of the left-hand end of liner section 6 is still greater than the diameter $d_3$, and section 6 flares outward to an even greater diameter $d_5$. Since the quantity of air flowing through the last annular louver 23b is comparatively small, and since the cooling requirements for the last liner section 7 are not so severe, by reason of the fact that combustion air entering through the succeeding ports 14 has effected considerable dilution and cooling of the combustion gases, the diameter $d_6$ of liner 7 may be made substantially or exactly equal to the diameter $d_5$ of the adjacent edge of liner 6.

As a general guide, it may be observed that the effective area of the supply space 2a decreases about 20% along the length of section 5.

The function of the beveled upstream liner edge portion 22 (Figure 3) will be seen from the following. Assume first that this beveled portion was omitted and the upstream edge of liner section 5 had a blunt leading edge 5a disposed normal to the approaching velocity $V_0$, as shown in Figure 5. This high velocity flow will tend to separate cleanly from the sharp corner 21a and impact directly on the normal surface 5a. The result will be that the approach velocity $V_0$ will be converted into oppositely directed transverse velocity components, represented by the arrows $V_1$ and $V_2$.

It will be apparent that the normal surface 5a thus forms a "baffle" or "scoop" serving to direct a portion of the approaching flow $V_0$ into the louver, as represented by velocity vector $V_2$. Furthermore, the impacting of the velocity $V_0$ on the blunt surface 5a will tend to form something of a "stagnation area" in which the static pressure is slightly increased. This increased static pressure at the inlet 23, taken in connection with the "velocity directing effect" of the surface 5a acting as a baffle, tends to substantially increase the flow through the louver.

This is undesirable, since every attempt is made in this design to reduce the flow through the louver in order that the spouting velocity from the discharge orifice 24 be comparatively low, perhaps on the order of 190 to 260 ft. per second, as compared with a spouting velocity of 300 to 400 ft. per second which would be produced if some of the velocity head $V_0$ in the supply space were converted to velocity $V_2$ into the louver inlet. The beveled end surface 22 serves to prevent this increase of flow into inlet 23, and at the same time serves to make the axial flow through the passage 2a more smooth and uniform. Since the diameter $d_4$ of liner section 6 is greater than the diameter $d_3$, a similar bevel is provided at the louver entrance 23a. On the other hand, since the diameter $d_6$ of liner section 7 is equal to the diameter $d_5$, the bevel is omitted and liner section 7 has a perfectly square blunt end section.

It will now be seen that each annular inlet opening 23 is in effect, by reason of the "sharp" corner 21a in combination with the "sharp" edge of the tapered portion 22, a "sharp-edged orifice" and that the high axial velocity of the fluid in passage 2a will tend to carry the fluid past this sharp-edged orifice with no tendency for the velocity head $V_0$ in the passage 2a to be converted into the vector $V_2$, with a resulting increase in the flow of air into the cooling louver.

The design of the discharge orifice 24 of each cooling louver is predicated on the theory, which has been confirmed by tests, that a comparatively lower velocity jet of a large cross section area has better "penetrating power" than a higher velocity jet of smaller size and the same mass flow. It has been discovered that the penetrating power of a jet is a function of its cross section area, since it is the "tearing effect" of the surrounding atmosphere on the stream which eventually breaks up the jet. In the present case, the annular jet issuing from the orifice 24 is bounded on one side by the inner surface of the next adjacent liner section, so that only the inner surface of the annular jet is subject to the deteriorating effect of the turbulent gases inside the liner. Thus the annular jet from the orifice 24 will persist farther than would be the case if it were subject on both sides to disturbance by a surrounding gaseous atmosphere.

Accordingly, in order to provide a jet of good penetrating power, the orifice 24 is made of a radial width $h$ of greater magnitude than has hitherto been employed in combustors of this type. Of course, other factors impose an upper limit on the size of this orifice, particularly the effect of too great a flow of cooling and insulating air on the temperature distribution of the hot gases supplied to the turbine. If the annular orifice 24 is too big, then there will be produced an excessively cool stratum of gas next to the inner surface of the liner, and this stratification may persist throughout the length of the liner so as to show up as non-uniform distribution of temperature at the liner exit. This has a deleterious effect on turbine rotor life and therefore must be avoided. In practicing this invention, it has been found that the radial width $h$ of the annular orifice 24 must be on the order of 1½% of the diameter of the liner.

The size of the annular inlet 23 to the cooling louver is determined by the consideration that it is desired that the major part of the total static pressure drop across the louver should occur at the discharge portion 24 rather than at the inlet portion 23. If the major portion of this pressure drop occurred at the entrance 23, then the resulting high velocity flow into the louver would be more difficult to direct into a smooth axial jet along the inner surface of the next liner section. It is much easier to produce the required uniformity of the cooling air sheath if the velocity through the entrance 23 is comparatively low and this air is accelerated at the discharge orifice 24. Accordingly, it has been found that the effective area of the inlet 23 should be substantially larger than the discharge orifice 24, the axial width $w$ of the inlet 23 being on the order of two times the radial height $h$ of the discharge orifice 24.

This will be understood better by reference to Figures 6 and 7. Assume first that the liner sections 4, 5 in Figure 6 are spaced axially to define a comparatively smaller annular inlet 23a while the annular discharge orifice 24a is larger than the inlet. Assuming now a velocity in passage 2a as represented by velocity vector $V_0$, the streamlines representing the flow through the inlet 23a would be something as represented by the broken flow lines $f_1$, $f_2$. It will be readily apparent that here it is the louver inlet 23a which presents a substantial restriction to the flow of fluid and therefore determines the fluid quantity flowing through the louver. The "flow coefficient" of inlet 23a would be rather poor, since its effective area could be represented as the cross-section area of the flow through the inlet 23a, measured in a direction normal to the average velocity $V_4$ therethrough. This effective area might, for instance, be represented by the dimension identified $A_1$ in Figure 6. It is to be noted that the flow line $f_1$ breaks sharply away from the inner surface of liner section 5 so that the stream represented by $f_1$, $f_2$ does not completely fill the discharge nozzle 24a.

On the other hand, with applicant's arrangement, the flow is as represented in Figure 7. Here the controlling restriction of the quantity flow through the louver is the smaller area opening at 24b, the inlet 23b being so much larger as to present little restriction to flow into the louver. Here it will be seen that the flow line $f_3$ still separates slightly from the inner surface of liner section 5, as indicated at $f_4$, but the fact that the major portion of the pressure drop occurs at the nozzle 24b insures that the flow will completely fill the nozzle. The other flow line $f_5$ breaks sharply away from the square corner 21a.

With this arrangement, the average velocity inwardly through the large inlet 23b is comparatively low, because the quantity flowing is determined by the flow restriction presented by the comparatively smaller nozzle 24b, and this quantity of fluid flows through the comparatively larger inlet 23b. This is the inverse of the arrangement in Figure 6, in which the higher velocity occurs at the inlet 23a, with the result that the velocity will tend to be lower at the discharge of the annular nozzle 21, as indicated by vector $V_5$. It will be apparent that the higher axial velocity represented by jet $V_3$ in Figure 7 is directly effective to produce the cooling and insulating effect desired on liner 5, while with the arrangement in Figure 6 the sheathing and cooling effect depends on the conversion of the velocity $V_4$ (which has a substantial radial component) into an effective axial jet at $V_5$. The direction of the velocity $V_5$ will obviously be much harder to control than with the arrangement in Figure 7, where the flow restriction occurs at 24b with the desired velocity $V_3$ being produced directly.

It is also important to the uniformity of the annular jet produced that the overlap $o$ be of a magnitude on the order of one to two times the radial height $h$ of the orifice 24. This is necessary in order that the fluid flowing radially through the orifice 23 may be directed into the axial direction and "smoothed out" to form a uniform annular jet.

It may be noted further that the overall static pressure drop from the inlet 23 to the exit 24 is desired to be on the order of 1% of the initial total head of the fluid in the supply passage 2a, this factor having an additional effect on the magnitude of the discharge orifice 24.

The fact that the louver ring 21 projects radially inward a small amount into the combustion space does not seem to have any adverse effect on the flow of hot gases in the liner. As a matter of fact, the smoothly inwardly curved portion 21d seems to serve the beneficial function of receiving any remnant of the insulating air sheath produced by the preceding annular orifice and directing this air with a radial component so as to mix it with the hot gases in the combustion space. It will, of course, be appreciated that by the time the insulating sheath of air from the preceding annular nozzle reaches this curved surface 21d it will have picked up considerable heat by contact with the inner surface of the liner as well as by radiation from the flame within the combustion space, so that it is too warm to properly serve as a cooling medium for the liner. At the same time this remnant of the insulating sheath is sufficiently lower in temperature than the average temperature of the combustion gases that it is necessary to mix it thoroughly with the hot gases in order to promote uniformity of temperature distribution. The smooth inwardly curved portion 21d of the louver ring 21 performs this function.

It will be apparent from Figs. 1 and 3 that the cross section of ring 21 is comparatively substantial, so that the ring has an important stiffening effect tending to hold the liner section to its true circular shape. This is important because any distortion would, of course, alter the thickness and uniformity of the air sheaths. The outward taper 21e at the terminal portion of the inner surface of the ring 21 is intended to provide a terminal edge portion 21f as narrow as possible in a radial direction. This is important since, if a blunt terminal edge of substantial radial width is permitted, there will be turbulent eddies produced in the wake of this blunt discharge edge; and such eddies have an extremely serious effect in disturbing the smooth surface of the jet issuing from the cooling louver. For this reason, the discharge edge 21f is made as narrow as possible consistent with the mechanical strength required.

With a liner structure having the mechanical and aerodynamic features described above, it is found that effective cooling of the liner sections is provided, with optimum freedom from carbon deposition on the interior surfaces thereof, together with long life and freedom from the necessity of frequent inspection to safeguard against excessive local carbon deposits, with the resulting hot spots and risk of mechanical failure.

It will, of course, be appreciated by those skilled in the art that a great many small changes might be made in the mechanical design of the parts. For instance, instead of the separately fabricated machined ring 21 forming the cooling and insulating louver, this section may be formed by being rolled integral with the end of the liner section, as suggested in Fig. 4. Here the corner 21g cannot be made quite as sharp as with the separately machined arrangement of Figs. 1 and 3, but by a careful rolling operation, this corner may be made to take a comparatively small radius curve, with substantially similar results to those obtained with the structure described above. Otherwise the arrangement of Fig. 4 is identical to that described above.

It will also be apparent that this special louver arrangement is applicable to annular combustors having a combustion space which is annular rather than circular as disclosed herein. In such a combustor, the "liner" would consist of a series of coaxial radially spaced sections having their adjacent edge portions forming the special louvers described above.

Many other modifications will be apparent to those skilled in the art; and it is desired to cover by the appended claims all such changes as fall within the true spirit and scope of my invention.

What I claim as new and desire to secure by Letters Patent of the United States is:

1. In a combustor having an outer housing containing a liner defining an axially elongated combustion chamber substantially closed at one end and formed of separate wall sections divided on planes normal to the axis of the combustion chamber and supported in spaced relation to the outer housing to define a combustion air supply passage therebetween, with means for supplying air under pressure to said passage with a high velocity toward the discharge end of the liner, the combination of a first liner section having a discharge end portion cooperating with the adjacent upstream end portion of the next liner section to form an annular nozzle for projecting a sheath of cooling and insulating fluid along the inner surface of said next adjacent section toward the discharge end thereof, said discharge end portion of the first section having a smooth outer surface terminating at a substantially sharp annular corner, a second portion projecting inwardly and having a substantially radial surface extending inwardly from said sharp corner, and a third portion extending axially and projecting in spaced parallel relation with and overlapping the inner surface of the second liner section to form said annular sheathing air nozzle, said first, second, and third portions of the first liner section cooperating to define a smoothly curved surface for receiving air radially and then turning it smoothly into an axial direction and discharging through said nozzle toward the discharge end of the second liner section, the adjacent edge of the second liner section being spaced axially from said sharp corner to define an annular inlet opening for the sheathing air nozzle, whereby fluid flowing at high axial velocity in the air supply spaced between liner and housing toward the discharge end thereof is caused to flow through the sheathing fluid nozzle by reason of the static pressure difference between the air supply and the combustion space pressure within the liner.

2. A combustor liner structure in accordance with claim 1 in which the radial spacing $h$ of the overlapping nozzle portion from the inner surface of the next adjacent liner section is on the order of 1½% of the transverse spacing $d$ between opposite liner wall portions, the overlap $o$ by which the louver-defining nozzle portion projects into the next adjacent liner section is on the order of 1 to 2 times $h$, and the axial width $w$ of the nozzle inlet opening is on the order of 2 times $h$.

3. In a generally cylindrical combustor for burning fluid fuels of the type having an outer housing containing an axially elongated liner substantially closed at one end defining the combustion space proper and formed of separate annular sections supported coaxially within the outer housing and spaced therefrom to define an annular combustion air supply passage therebetween, with means for supplying air under pressure to said passage with a high axial velocity toward the discharge end of the liner, the combination of a first substantially cylindrical liner section having a reduced diameter discharge end portion projecting into the adjacent upstream end portion of the next liner section to define an annular nozzle for projecting a sheath of cooling and insulating fluid along the inner surface of said next adjacent section toward the discharge end thereof, said discharge end portion of the first section having a smooth outer surface terminating at a louver-defining ring including a first ring portion defining a substantially sharp annular corner, a second ring portion projecting inwardly and forming a substantially radial annular surface extending inwardly from said sharp corner, and a third ring portion extending axially and projecting in coaxial relation into and spaced radially from the inner surface of the second liner section to form said annular nozzle for the cooling and insulating fluid, said first, second, and third portions of the louver-defining ring cooperating to define a smoothly curved surface for receiving air radially and then turning it smoothly into an axial direction and discharging through said annular nozzle toward the discharge end of the second liner section, whereby fluid flowing at high axial velocity in the air supply passage between liner and housing toward the discharge end thereof is caused to flow through the annular louver by the static pressure drop from the air supply passage to the combustion space.

4. A combustor liner in accordance with claim 3 in which the radial height $h$ of the annular nozzle is on the order of 1½% of the diameter $d$ of the liner section, the axial overlap $o$ by which the louver-defining ring projects into the next adjacent liner section is on the order of one to two times $h$, and the axial width of the louver inlet opening defined between the sharp annular corner and the adjacent edge of the second liner section is on the order of two times $h$, the inner surface of said louver-defining ring being curved at its upstream side to form a smooth continuation of the inner surface of the first liner section, and the downstream portion of the louver-defining ring being tapered to a narrow annular discharge edge.

5. In a cylindrical fluid fuel combustor of the type having an outer housing containing an axially elongated liner defining the combustion space and formed of separate annular sections supported coaxially within the outer housing and spaced therefrom to define an annular combustion air supply passage therebetween with means for supplying air under pressure thereto at high axial velocity toward the discharge end of the liner, the combination of a first substantially cylindrical liner section having a discharge end portion projecting into the adjacent upstream end portion of the next liner section to define an annular nozzle for projecting a sheath of cooling and insulating fluid along the inner surface of said next adjacent section, said discharge end portion having a smooth outer surface terminating at a louver-defining ring including a first ring portion defining a substantially sharp annular corner, a second ring portion projecting inwardly and forming a substantially radial annular surface extending inwardly from said sharp corner, and a third ring portion extending axially and projecting in coaxial relation into and spaced radially a distance $h$ from the inner surface of the second liner section to form said annular nozzle for the cooling and insulating fluid, said dimension $h$ being on the order of 1½% of the diameter of the liner section, said first, second, and third portions of the louver-defining ring cooperating to define a smoothly curved outer surface for receiving air in a generally radial direction and then turning it smoothly into an axial direction and discharging through said annular nozzle, the axial overlap $o$ by which the louver-defining ring projects into the next adjacent liner section being on the order of one to two times $h$, the axial width of the louver inlet opening between the sharp annular corner and the adjacent edge of the second liner section being on the order of two times $h$, the inner diameter of the outer housing being substantially constant and the upstream end of the second liner section being appreciably greater in diameter than the adjacent end of the first liner section, said upstream end of the second liner section having an outer surface tapering so that the extreme upstream end portion of the second liner section has a minimum outer diameter substantially equal to that of the adjacent portion of the first liner section, whereby air flowing at high velocity in the supply space between liner and housing flows past the entrance to said annular louver with a minimum conversion of velocity head of the fluid in said supply passage into static head at the entrance to the louver.

6. In a combustor having an outer housing containing an axially elongated liner defining a combustion chamber substantially closed at one end and formed of separate annular sections supported coaxially within the outer housing and spaced therefrom to define an annular combustion air supply passage with means for supplying air under pressure to said passage with a high velocity toward the discharge end of the liner, the combination of a first substantially cylindrical liner section having a discharge end portion cooperating with the adjacent upstream end portion of the next liner section to form an annular nozzle for projecting a sheath of cooling and insulating fluid along the inner surface of said next adjacent section toward the discharge end thereof, said discharge edge portion of the first liner section having a smooth outer surface terminating at a substantially sharp annular corner, a second portion projecting inwardly and having a substantially radial annular surface extending inwardly from said sharp corner, and a third annular nozzle portion extending axially and projecting in coaxial relation with and spaced radially inward from the inner surface of the second liner section to define said annular nozzle, said first, second, and third portions of the first liner section cooperating to define a smoothly curved outer surface for receiving air radially and then turning it smoothly into an axial direction and discharging through said annular nozzle toward the discharge end of the second liner section, the adjacent edge of the second liner section being spaced axially from said sharp annular corner to define an annular inlet opening for the sheathing air nozzle, the inner diameter of the outer housing being substantially constant and the upstream end of the second liner section being appreciably greater in diameter than the adjacent end of the first liner section, said end of the second section having an outer surface tapering so that the extreme upstream end portion of the second section has a minimum outer diameter substantially equal to that of the adjacent portion of the first liner section, whereby air flowing at high velocity in the annular supply space between liner and housing is maintained at substantially constant velocity for effective cooling of the outer surface of the liner with a minimum disturbance of said high velocity flow occasioned by the change in diameter of successive liner sections and with a minimum tendency for velocity head of the fluid in said supply passage to be converted into static head at the entrance to the sheathing fluid louvers.

References Cited in the file of this patent

UNITED STATES PATENTS

| | | |
|---|---|---|
| 2,143,259 | Clarkson | Jan. 10, 1939 |
| 2,268,464 | Seippel | Dec. 30, 1941 |
| 2,446,059 | Peterson et al. | July 27, 1948 |
| 2,458,497 | Bailey | Jan. 11, 1949 |
| 2,470,184 | Pfenninger | May 17, 1949 |
| 2,477,584 | De Zubay | Aug. 2, 1949 |
| 2,510,645 | McMahan | June 6, 1950 |
| 2,531,810 | Fyffe | Nov. 28, 1950 |
| 2,541,170 | Mayers et al. | Feb. 13, 1951 |
| 2,541,900 | Williams | Feb. 13, 1951 |
| 2,555,965 | Garber | June 5, 1951 |

FOREIGN PATENTS

| | | |
|---|---|---|
| 621,438 | Great Britain | Apr. 8, 1949 |